A. L. Taylor,
Knife Handle.

No. 97,991. Patented Dec. 14, 1869.

WITNESSES
G. M. Plympton
H. S. Wattenberg

INVENTOR
Albert L. Taylor
per G. M. Plympton

United States Patent Office.

ALBERT L. TAYLOR, OF SPRINGFIELD, VERMONT.

Letters Patent No. 97,991, dated December 14, 1869.

---

IMPROVEMENT IN HANDLES FOR KNIVES.

---

The Schedule referred to in these Letters Patent and making part of the same.

---

*To all whom it may concern:*

Be it known that I, ALBERT L. TAYLOR, of Springfield, in the county of Windsor, and State of Vermont, have invented a new and improved Handle for Knives, &c.; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

This invention relates to a new and useful improvement in knife and other handles, and consists in filling such handles with wood, hard rubber, or other suitable material, in such manner as will render the handles durable, ornamental, and cheap.

The substances heretofore employed in filling knife and other handles, such as rosin or composition, have always been objectionable, for the reason that they are friable and easily broken, and more or less pulverized, affording no support to the shell of the handle, which would invariably become dented, unsightly, and useless.

In the accompanying sheet of drawings—

Figure 1:
Figure 2:
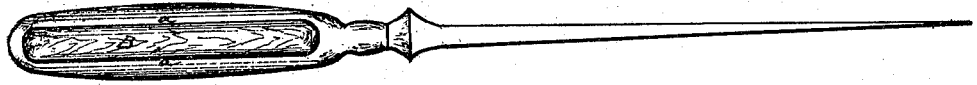

Figure 1 represents a side view of a knife fitted with my improved handle;

Figure 2, a plan or top view of the same; and

Figure 3:
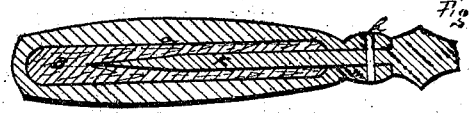

Figure 3, a sectional view of the handle, taken in the plane of the line $x\,x$, fig. 2.

Similar letters of reference indicate corresponding parts in the several drawings.

To enable others skilled in the art to make and use my invention, I proceed to describe it, as follows:

A is a metallic knife-handle, of the ordinary shape, and of any size, cast or otherwise, constructed with a rectangular opening, $a$, in the direction of its length, so that the handle thus formed becomes a shell for the reception of the filling hereinafter described.

B is a piece of any ordinary hard and close-grained wood, well seasoned, or hard rubber, or other suitable material, and susceptible of receiving a polish, cut of such size in its length and width as will closely and accurately fit into the rectangular opening $a$, formed as before described, in the handle A, thus forming a filling, and making a solid, ornamental, and economical handle for the knife, &c.

The filling A, after being inserted, is kept firmly in position by the tang $k$ of the blade, which passes tightly into and nearly through it, when the blade and handle are joined. This tang being tapering, it has the effect, when driven into the filling, to expand the same, and thereby tighten it in the part A.

The handle and blade being thus united, are strongly held together by the rivet $h$, which passes through the shoulder $m$ and tang $k$.

The outer edges $n\,n$ of the filling A are allowed to project a little beyond either edge of the metallic shell, so that they may be rounded or finished off to conform to the general shape and outline of the knife-handle. The edges thus projecting being afterward carefully polished, the handle is completed.

Having thus described my invention,

What I claim as new, and desire to secure by Letters Patent, is—

The filling B, inserted in the handle A, and projecting at the sides thereof, and held tightly in said handle by the tapering tang $k$, which, when driven into the filling, expands the same, and renders it permanently rigid, the blade being secured in the handle by the rivet $a$ passing through the part A and the tang, all as herein described.

ALBERT L. TAYLOR.

Witnesses:
M. L. LAWRENCE,
HENRY CLOSSON.